US011009316B2

(12) United States Patent
Lam et al.

(10) Patent No.: US 11,009,316 B2
(45) Date of Patent: May 18, 2021

(54) MULTI-MODE ADAPTIVE NONLINEAR TRAJECTORY SHAPING (NTS) GUIDANCE LAW

(71) Applicant: BAE SYSTEMS Information and Electronic Systems Integration Inc., Nashua, NH (US)

(72) Inventors: Quang M. Lam, Fairfax, VA (US); Michael J. Choiniere, Merrimack, NH (US); David A. Richards, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 157 days.

(21) Appl. No.: 16/178,706

(22) Filed: Nov. 2, 2018

(65) Prior Publication Data
US 2020/0141699 A1    May 7, 2020

(51) Int. Cl.
*F41G 7/22*    (2006.01)
*G05D 1/12*    (2006.01)
(Continued)

(52) U.S. Cl.
CPC ........... *F41G 7/2246* (2013.01); *G05D 1/107* (2013.01); *G05D 1/12* (2013.01)

(58) Field of Classification Search
CPC ......... F41G 7/2246; G05D 1/12; G05D 1/107
See application file for complete search history.

(56) References Cited

U.S. PATENT DOCUMENTS 5,975,460 A * 11/1999 Elkanick ............... F41G 7/22
                                                    244/3.15
6,064,332 A *  5/2000 Cloutier ............... G05D 1/107
                                                    244/3.14
(Continued)

FOREIGN PATENT DOCUMENTS

WO     2007/016098 A2     2/2007
WO   WO2013/111138 A1 *  8/2013    ............... G05D 1/12

OTHER PUBLICATIONS

E. Berglund, "Guidance and Control Technology"; paper presented at the RTO SCI Lecture Series on "Technologies for Future Precision Strike Missile Systems"; presented at Atlanta, Georgia, USA on Mar. 23-24, 2000, and published in RTO-EN-13. (Year: 2000).*
(Continued)

*Primary Examiner* — Bernarr E Gregory
(74) *Attorney, Agent, or Firm* — KPIP Law, PLLC; Scott J. Asmus

(57) ABSTRACT

A method and system for nonlinear trajectory shaping guidance law capable of providing a robust guidance solution suitable for multi-mission, multi-mode operations. The nonlinear trajectory shaping guidance law offers (1) a dual layered GL gains calculation: (i) NTS time varying adjustment accounting for engine on/off and L/D variation and (ii) general explicit guidance algorithm based sub-optimal fixed-gain selection while still maintaining its trajectory shaping capability for short range to go missions; (2) flight path angle (FPA) command tracking and following to ensure a high probability of target destruction while minimizing collateral damages; (3) high precision impact point calculation factoring in target location errors or motion and maneuvering uncertainties; and (4) heading error angle minimization.

16 Claims, 9 Drawing Sheets

(51) Int. Cl.
*G05D 1/10* (2006.01)
*F41G 7/00* (2006.01)

(56) References Cited

U.S. PATENT DOCUMENTS

| | | | | |
|---|---|---|---|---|
| 6,122,572 | A * | 9/2000 | Yavnai | G05D 1/0088 342/13 |
| 7,185,844 | B2 * | 3/2007 | Yanushevsky | G05D 1/12 244/195 |
| 8,120,526 | B2 | 2/2012 | Holder | |
| 8,854,252 | B2 | 10/2014 | Holder | |
| 9,401,741 | B2 | 7/2016 | Holder et al. | |
| 9,696,418 | B2 | 7/2017 | Holder | |
| 2012/0036095 | A1 * | 2/2012 | Omar | G05D 1/107 706/14 |
| 2012/0036096 | A1 * | 2/2012 | Omar | G06N 3/126 706/14 |
| 2017/0314892 | A1 | 11/2017 | Holder | |

OTHER PUBLICATIONS

Chang-Hun Lee et al., "A New Command Shaping Guidance Law using Lagrange Multiplier"; IFAC-PapersOnLine; vol. 50, issue 1; Jul. 2017; pp. 15185-15190; published by Elsevier, Amsterdam, The Netherlands. (Year: 2017).*

"Heterodyne", https://en.wikipedia.org/wiki/Heterodyne, known of at least since Apr. 24, 2019.

"Interferometry", https://en.wikipedia.org/wiki/Interferometry, known of at least since Apr. 24, 2019.

Monopulse radar, https://en.wikipedia.org/wiki/Monopulse_radar, known of at least since Apr. 24, 2019.

"Pulse-Doppler signal processing", https://en.wikipedia.org/wiki/Pulse-Doppler_signal_processing, known of at least since Apr. 24, 2019.

"Undersampling", https://en.wikipedia.org/wiki/Undersampling, known of at least since Apr. 24, 2019.

Armin W. Doerry, "SAR Processing with Stepped Chirps and Phased Array Antennas", Sandia Report, Sandia National Laboratories, Printed Sep. 2006, Albuquerque, NM.

M. Mallick et al., "Angle-only filtering in 3D using Modified Spherical and Log Spherical Coordinates", 14th International conference on Information Fusion, Chicago, Illinois; pp. 1905-1912, Jul. 5-8, 2011.

K. Radhakrishnan et al., "Bearing only Tracking of Maneuvering Targets using a Single Coordinated Turn Model", International Journal of Computer Applications (0975-8887) vol. 1—No. 1, pp. 25-33; 2010.

* cited by examiner

MULTI-MODE ADAPTIVE NONLINEAR TRAJECTORY SHAPING (NTS) GUIDANCE LAW

FIELD OF THE DISCLOSURE

The present disclosure presents a multi-mission, multi-mode guidance subsystem using nonlinear trajectory shaping (NTS) based techniques to achieve an effective guidance law (GL) applicable to several object types and capable of engaging various target types.

BACKGROUND OF THE DISCLOSURE

Conventional guidance subsystems such as proportional navigation (PN) based guidance laws (e.g., modified PN, Augmented PN (APN), commanded line of sight (CLOS)) and NTS based guidance laws (SDRE based NTS or Sliding Mode NTS) are solutions with limited performance capabilities that are not adaptable or capable of coping with weapon and target engagement uncertainties at the systems level. Some of those uncertainties include but are not limited to (i) target location errors (for static) and target maneuvering (for dynamic) uncertainties; (ii) sensor/seeker noise and look angle constraints; (iii) impact angle command following and enforcement; (iv) nonlinear shaping capabilities with a great layer of robustness dealing with mission variations; just to name a few. For instance, advanced guidance laws (GL) are expected to be capable of accomplishing multi-missions, e.g., short-range air defense or surface-to-surface engagement, while offering adaptation and self-adjusting capabilities against unpredictable systems uncertainties and matching future weapons' stringent requirements such as multiple target engagement and/or target re-assignment after launch.

The present disclosure offers an NTS-based GL solution that is capable of resolving the aforementioned shortcomings of mainstream GL techniques while providing a robust guidance solution that is suitable for multi-mission, multi-mode operations. Wherefore it is an object of the present disclosure to overcome the above-mentioned shortcomings and drawbacks associated with the conventional guidance laws.

SUMMARY OF THE DISCLOSURE

One aspect of the present disclosure is a nonlinear trajectory shaping guidance law, comprising: a dual layered nonlinear trajectory shaping guidance law calculation comprising, an adaptive gain calculation for velocity gain, $K_1(t)$, and position gain, $K_2(t)$; and a sub-optimal gain calculations for $K_1=-2$ and $K_2=6$, utilizing a general explicit guidance algorithm; flight path angle command tracking; one or more high order shaping coefficients; lift/drag information, and input from target state estimators and projectile state estimators according to $$a_c = \frac{K_1}{t_{go}}(V_f - V_m) + \frac{K_2}{t_{go}^2}(r_f - r_m - V_m t_{go})$$

where $a_c$ is commanded acceleration vector; $t_{go}$ is time to go; $V_f$ is final velocity vector at impact factoring in a flight path angle constraint; $V_m$ is current missile velocity vector; $r_f$ is the predicted intercept point (PIP) computed in real time factoring in the target dynamic motion and maneuvering (with $V_t$ (velocity) and $A_t$ (acceleration)), where $r_f = r_t + V_t * t_{go} + 0.5 * A_t * t_{go}^2$; and $r_m$ is current missile position vector in 3-D.

One embodiment of the nonlinear trajectory shaping guidance law is wherein the system accounts for seeker look angle constraints during the $r_f$ and $V_f$ calculation process.

Another embodiment of the nonlinear trajectory shaping guidance law is wherein the target state estimator utilizes data from an EO/IR and/or a RF seeker.

In certain embodiments, the predicted intercept point (PIP) calculation is done in real time while steering the weapon's velocity vector at impact time in such a way that it will maximize the velocity and improve the impact angle to ensure a greater accuracy while minimizing potential collateral damage. In some cases, the impact angle approaches head-on such that the flight path angle is greater than about 80° and less than about 90°.

Yet another embodiment of the nonlinear trajectory shaping guidance law is wherein the guidance law is used as a multi-mission system where missions may be surface-to-surface air defense and/or air-to-ground.

Still yet another embodiment of the nonlinear trajectory shaping guidance law is wherein the guidance law is fed into an auto-pilot system resulting in accurate targeting for multi-mission, multi-target scenarios.

Another aspect of the present disclosure is a method for guiding projectiles using a nonlinear trajectory shaping (NTS) guidance law, comprising: incorporating target state estimation data to a dual layered nonlinear trajectory shaping guidance law calculation, where the dual layered nonlinear trajectory shaping guidance law calculation comprises: calculating adaptive gain for velocity gain, $K_1(t)$, and position gain, $K_2(t)$; and calculating sub-optimal gain for $K_1=-2$ and $K_2=6$, utilizing a general explicit guidance algorithm; wherein the dual layered nonlinear trajectory shaping guidance law further incorporates flight path angle command tracking; one or more high order shaping coefficients; lift/drag information, and input from projectile state estimators according to $$a_c = \frac{K_1}{t_{go}}(V_f - V_m) + \frac{K_2}{t_{go}^2}(r_f - r_m - V_m t_{go})$$

where $a_c$ is commanded acceleration vector; $t_{go}$ is time to go; $V_f$ is final velocity vector at impact factoring in a flight path angle constraint; $V_m$ is current missile velocity vector; $r_f$ is the predicted intercept point (PIP) computed in real time factoring in the target dynamic motion and maneuvering (with $V_t$ (velocity) and $A_t$ (acceleration)), where $r_f = r_t + V_t * t_{go} + 0.5 * A_t * t_{go}^2$; and $r_m$ is current missile position vector in 3-D.

One embodiment of the method for guiding projectile using a nonlinear trajectory shaping guidance law according is wherein the system accounts for seeker look angle constraints during the $r_f$ and $V_f$ calculation process.

Another embodiment of the method for guiding projectile using a nonlinear trajectory shaping guidance law is wherein the target state estimator utilizes data from an EO/IR and/or a RF seeker.

In certain embodiments of the method for guiding projectile using a nonlinear trajectory shaping guidance law, the predicted intercept point (PIP) calculation is done in real time while steering the weapon's velocity vector at impact time in such a way that it will maximize the velocity and improve the impact angle to ensure a greater accuracy while minimizing potential collateral damage. In some cases, the impact angle approaches head-on such that the flight path angle is greater than about 80° and less than about 90°.

Yet another embodiment of the method for guiding projectile using a nonlinear trajectory shaping guidance law is wherein the guidance law is used as a multi-mission system where missions may be surface-to-surface, air defense, and/or air-to-ground.

Still yet another embodiment of the method for guiding projectile using a nonlinear trajectory shaping guidance law is wherein the guidance law is fed into an auto-pilot system resulting in accurate targeting for multi-mission, multi-target scenarios.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Current guidance laws (GLs) such as proportional navigation (PN) based design techniques, may not be suitable for particular command guidance frameworks. In a ground-based sensor subsystem, line of sight (LOS) angular rate estimates or motion measurements, (dλ/dt), from a munition's on-board seeker to a target are not available. Additionally, closing velocity, Vc, from the target to the bullet is not available in ground-based sensor systems. Proportional navigation (PN) based guidance law gain N is also fixed and does not account for low altitude aerodynamic lift and drag coefficients efficiently. Additionally, PN based guidance laws do not offer flight path angle (FPA) shaping capability.

Figure 1:
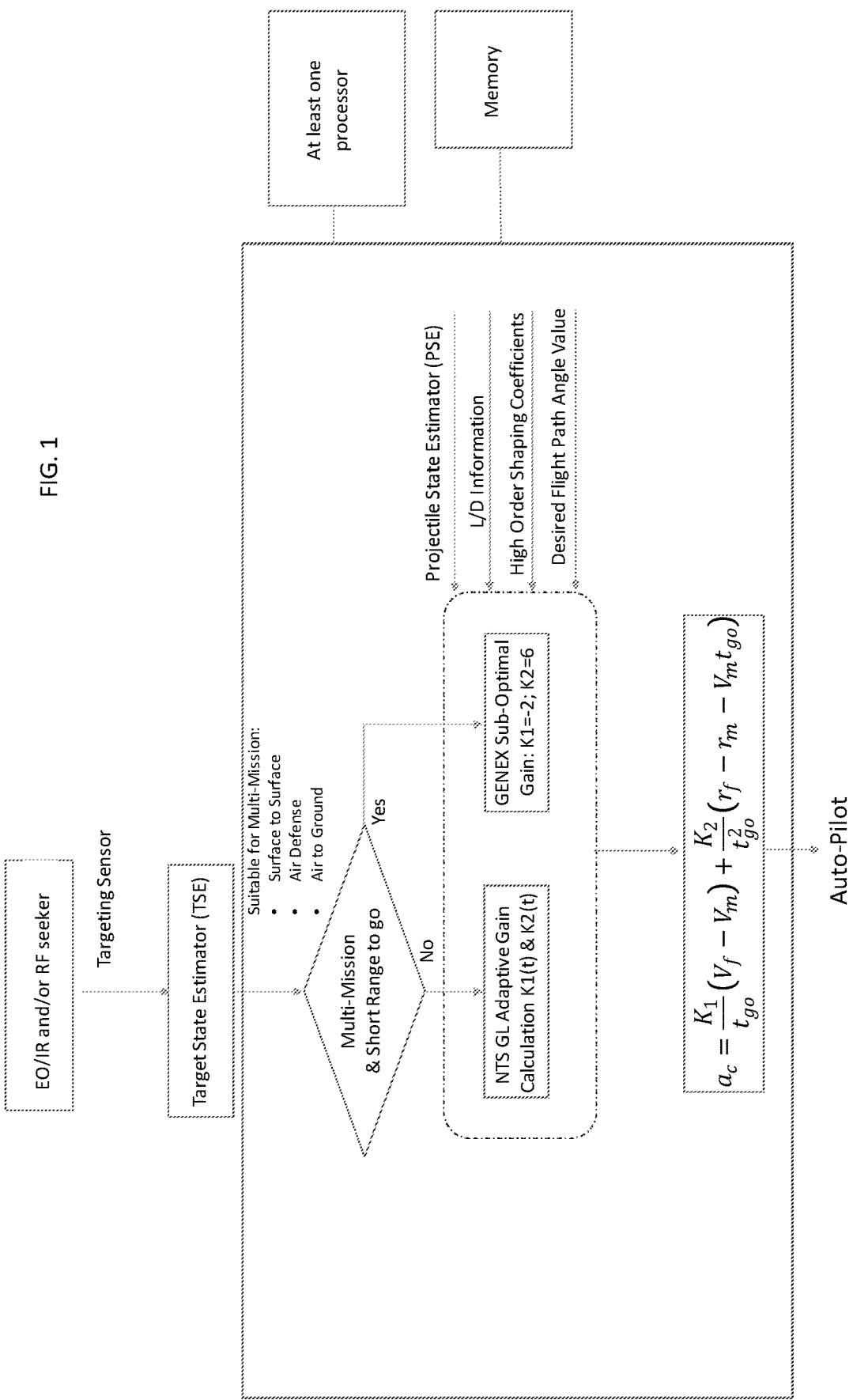
FIG. 1 is a flow chart of one embodiment of the overall processing flow of the nonlinear trajectory shaping (NTS) guidance law (GL) of the present disclosure along with some performance features such as dual layered NTS GL calculation, flight path angle command tracking, and high order shaping coefficients.

Referring to FIG. 1, the overall processing flow of one embodiment of the nonlinear trajectory shaping (NTS) guidance law (GL) disclosure of the present disclosure is shown. More specifically, a few of the performance features such as dual layered NTS GLs calculation; flight path angle command tracking; and high order shaping coefficients are highlighted. The present disclosure provides an advanced nonlinear trajectory shaping guidance law (NTS-GL) having the following new features and performance capabilities.

Still referring to FIG. 1, a predicted intercept point (PIP) calculation is done in real time while steering the weapon's velocity vector at impact time in such a way that it will maximize the velocity and improve the impact angle as a head-on (i.e., maximum flight path angle (FPA) enforcement, i.e., 80°<FPA<90°) to ensure a greater accuracy while minimizing potential collateral damage.

In certain embodiments of the NTS GL of the present disclosure, adaptive gains calculations account for engine on-off and lift/drag (L/D) information while being wrapped around by a sub-optimal General Explicit Guidance (GENEX) algorithm with gain setting as backup (i.e., velocity gain set at −2 and position gain set at 6 as shown in the equation (1) below). This is suitable for multi-mission servicing while maintaining its performance versatility.

$$a_c = \frac{K_1}{t_{go}}(V_f - V_m) + \frac{K_2}{t_{go}^2}(r_f - r_m - V_m t_{go}) \qquad (1)$$

where $a_c$ is the NTS GL's commanded acceleration vector; $t_{go}$ is time to go; $K_1$ & $K_2$ are NTS GL Gains; $V_f$ is Final Velocity Vector at impact factoring in the flight path angle constraint; $V_m$ is the current missile velocity vector; $r_f$ is the predicted intercept point (PIP) computed in real time (see FIG. 1) factoring in the target dynamic motion and maneuvering ($V_t$ (velocity) and $A_t$ (acceleration)), where $r_f = r_t + V_t * t_{go} + 0.5 * A_t * t_{go}^2$; and $r_m$ is the current missile position vector in 3-D. The system accounts for seeker look angle constrain during the $r_f$ and $V_f$ calculation process.

According to the present disclosure, a target state estimator (TSE) utilizes information from one or more targeting sensors. In one embodiment the targeting sensor is an EO/IR sensor, a RF seeker, or the like. The system is suitable for multi-mission use. In some cases the missions are surface-to-surface, air defense, air-to-ground, and the like. In one embodiment, the TSE is input for the multi-mission module and determination of whether or not there remains a short range-to-go. If there is not then in one embodiment an adaptive gain calculation for $K_1(t)$ and $K_2(t)$ is conducted according to the NTS GL. If there is a short range to go, a general explicit guidance (GENEX) algorithm is used to calculate sub-optimal gain where $K_1=-2$ and $K_2=6$, for example. In certain embodiments, the projectile state estimator (PSE) is used as well as an accounting for L/D information, high-order shaping coefficients and any desired flight path angle values (e.g., >80°). All of this is fed into an auto-pilot system resulting in highly accurate targeting for multi-mission, multi targets scenarios.

Certain embodiments of the present disclosure utilize high order shaping coefficients using nonlinear Bessel function and final velocity steering via flight path angle command tracking. FIG. 2-FIG. 7 illustrate embodiments of the NTS GL of the present disclosure for an air to ground engagement mission.

Figure 2:
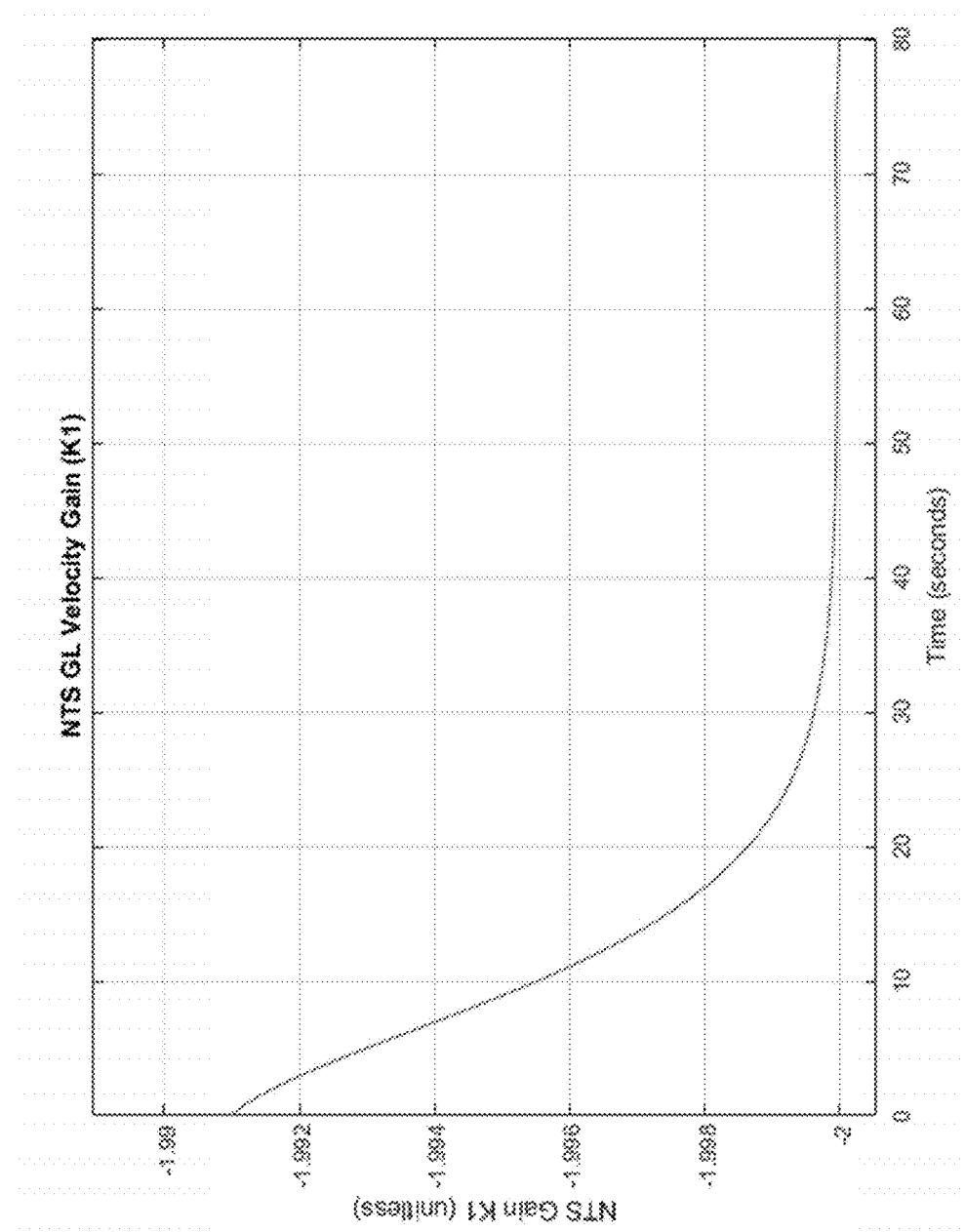
FIG. 2 is a plot showing one embodiment of NTS GL adaptive velocity gain over time (K1(t)) according to the principles of the present disclosure.
Figure 3:
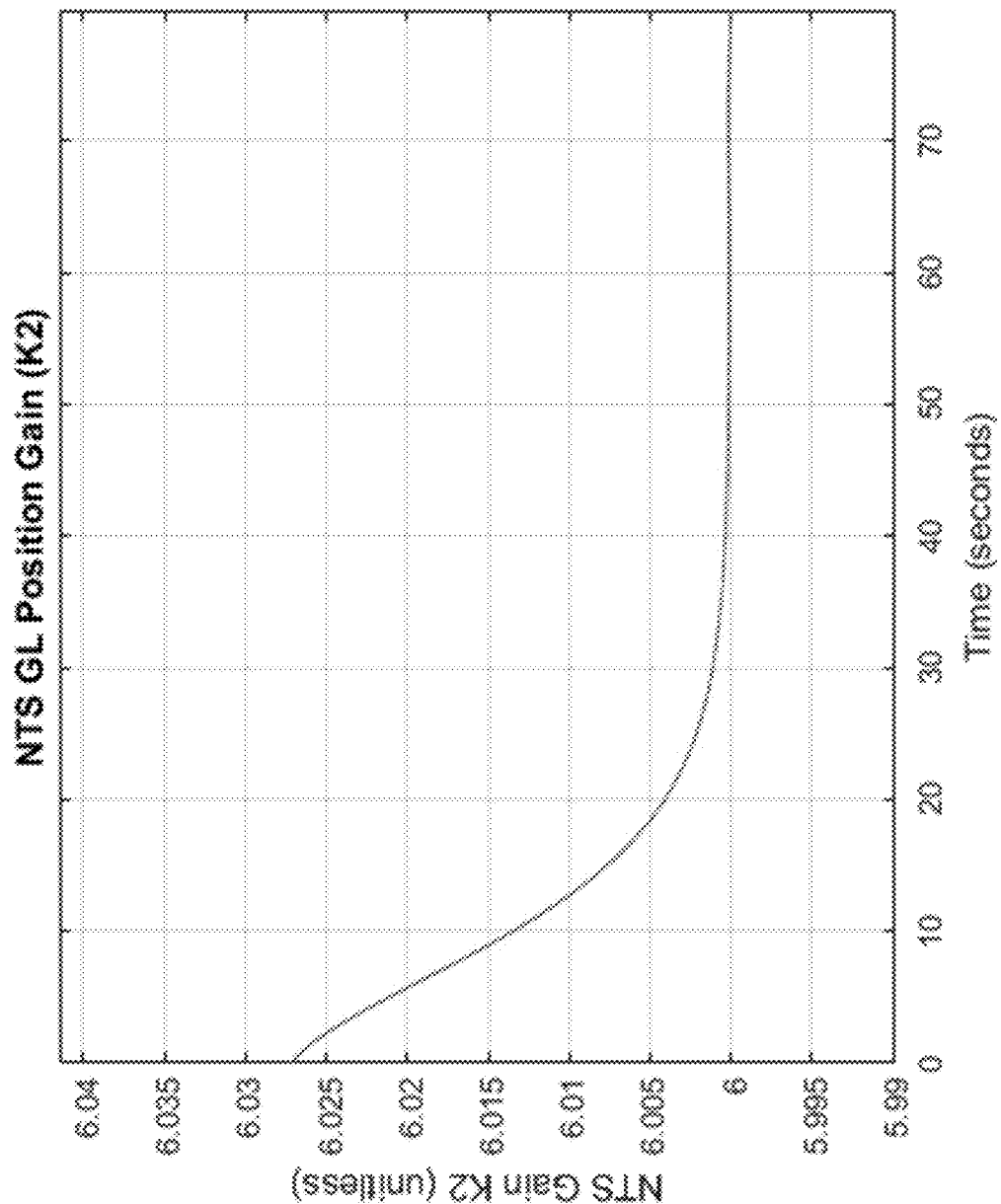
FIG. 3 is a plot showing one embodiment of NTS GL adaptive position gain over time (K2(t)) according to the principles of the present disclosure.
Figure 4:
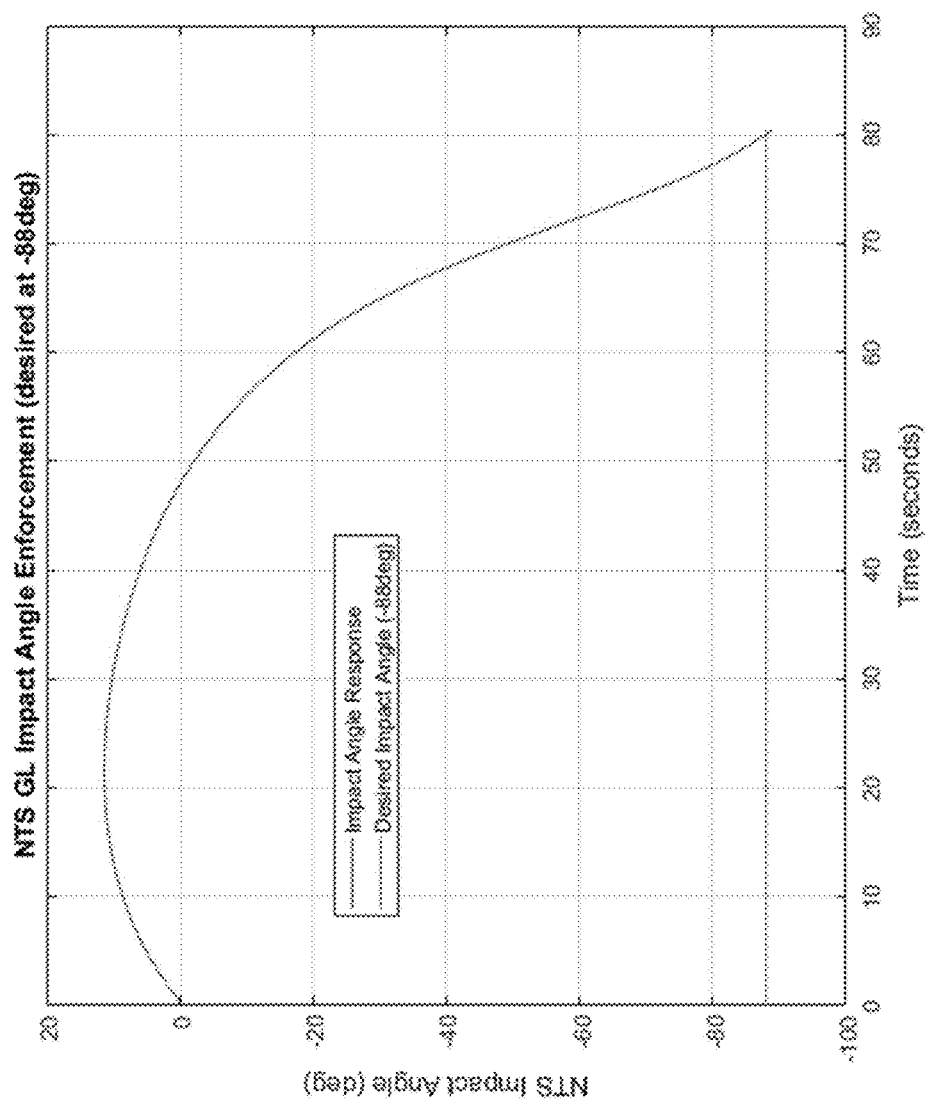
FIG. 4 is a plot showing one embodiment of NTS GL impact angle enforcement or flight path angle enforcement over time according to the principles of the present disclosure.
Figure 5:
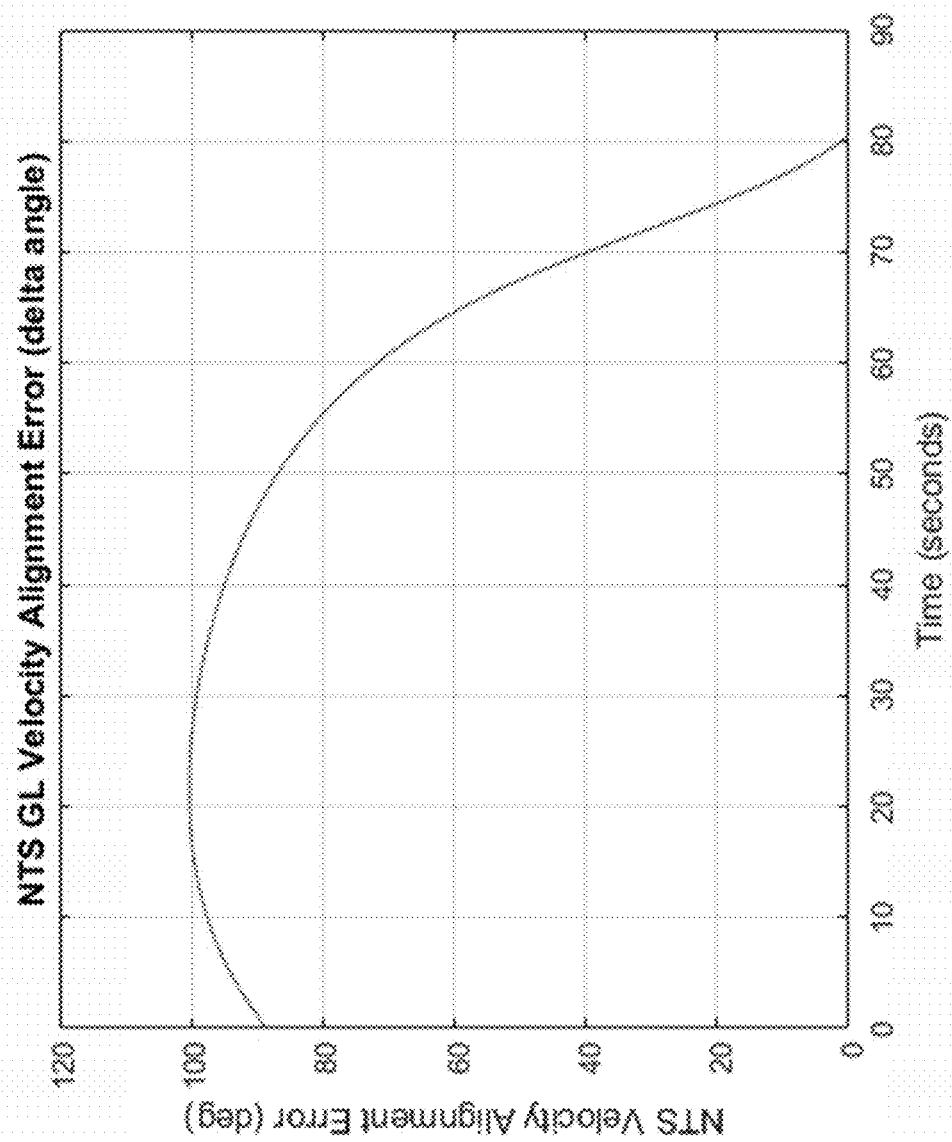
FIG. 5 is a plot showing one embodiment of NTS GL final velocity angle alignment with target over time according to the principles of the present disclosure.
Figure 6:
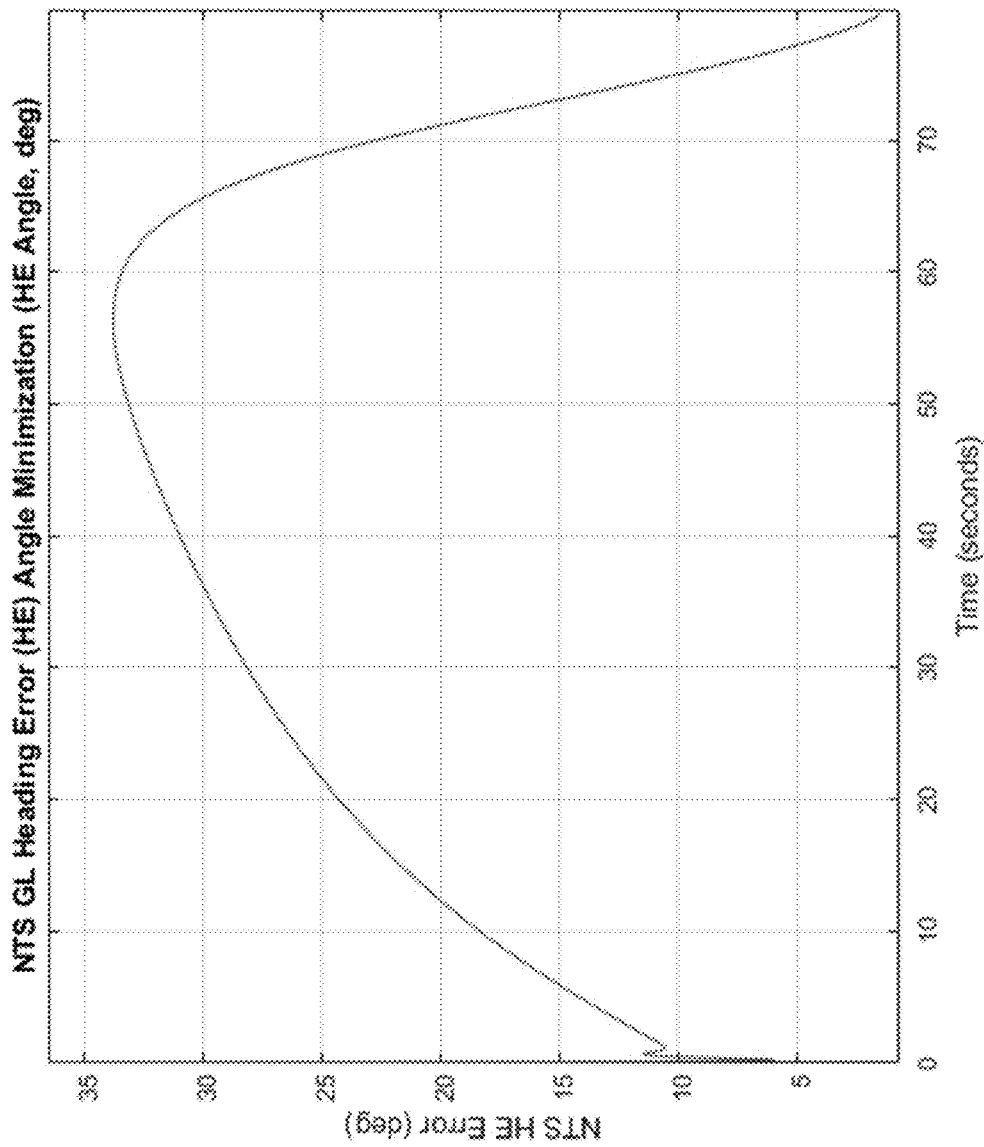
FIG. 6 is a plot showing one embodiment of NTS GL heading error angle minimization over time according to the principles of the present disclosure.

For the air to ground engagement mission, FIG. 2 and FIG. 3 present the NTS GL adaptive gain adjusted in real time during the engagement flight condition while FIG. 4 illustrates the NTS GL impact angle command following and enforcement. FIG. 5 and FIG. 6 demonstrate the ability to steer the missile velocity vector in a direction to support the impact angle command tracking (See, FIG. 4) and minimize the heading angle error in a timely fashion to allow an acceptable miss distance (MD) needed per respective mission requirement (i.e., air defense with an MD of less than 1 m, while for a surface to surface engagement an MD of <10 m).

Figure 7:
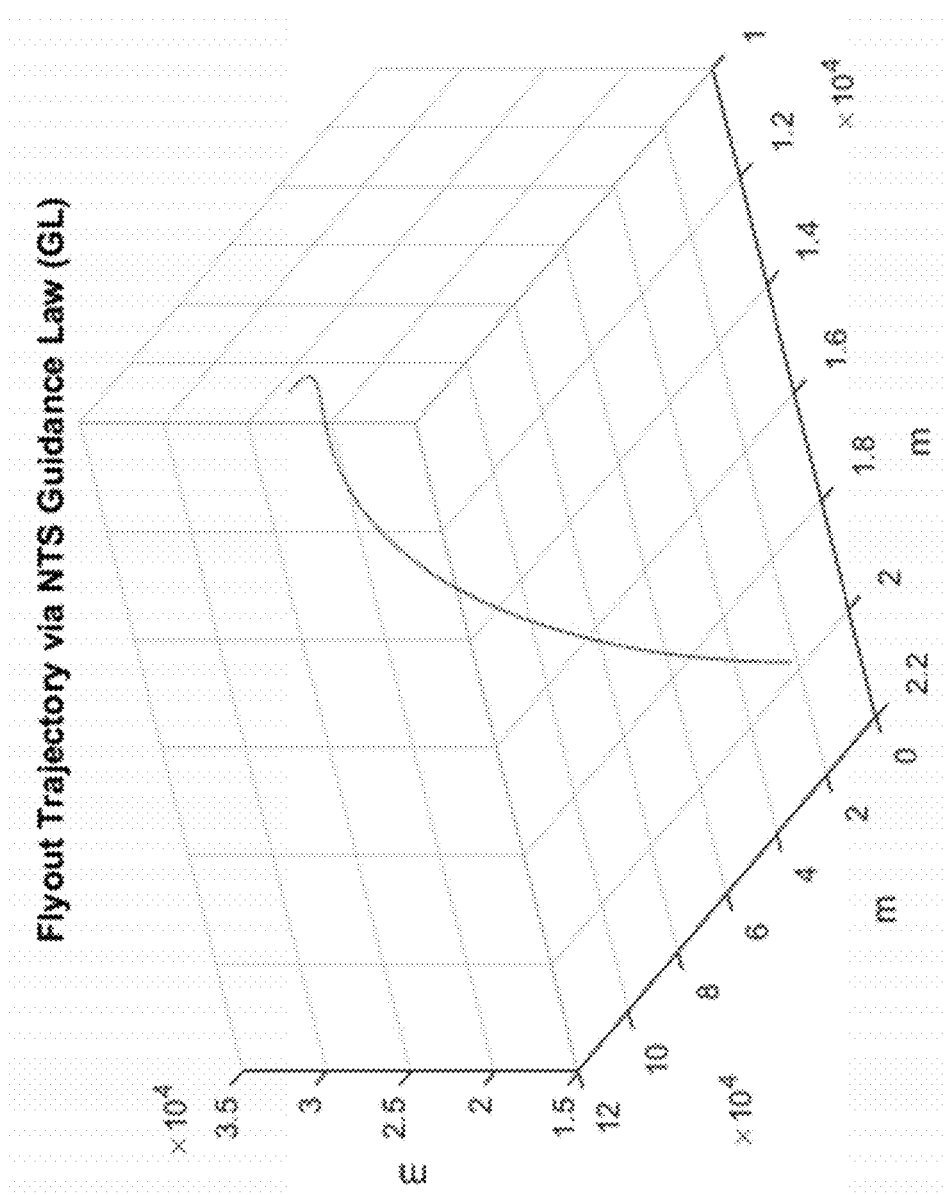
FIG. 7 illustrates a flyout trajectory for one embodiment of the proposed NTS GL for an air to ground engagement flight condition according to the principles of the present disclosure.
Figure 8:
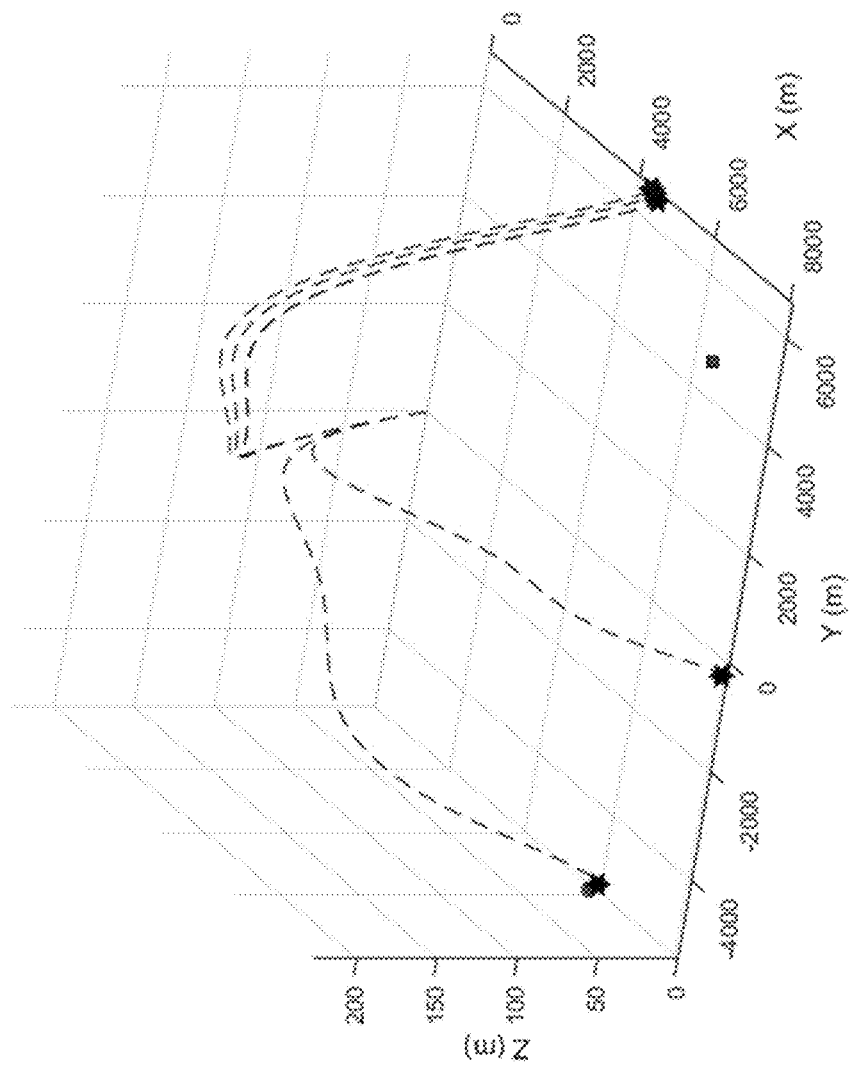
FIG. 8 illustrates one embodiment of an NTS GL demonstration of short range surface-to-surface projectiles in a many-on-many engagement scenario according to the principles of the present disclosure.

In one embodiment of the present disclosure, the NTS GL is capable of engaging various target types (e.g., from ground based to air based targets, FIG. 7 and FIG. 8, for example). By employing the proposed NTS-based GL, an effective multi-mode, multi-mission adaptive guidance law solution can be achieved. In some embodiments, the system has one or more of the following attributes: (1) the ability to account for target maneuvering uncertainties (See, FIG. 1 for the predicted intercept point calculation accounting for target position, velocity, and acceleration information; (2) the ability to strike a target at a steeper flight path angle compared to other guidance laws (e.g., >80°); (3) the ability to hit moving targets at a much more precise CEP/SEP (circular or spherical error probable, respectively) than other guidance laws; (4) the ability to compensate for initial heading error; (5) a self-contained time-to-go calculation and predicted intercept point (PIP) calculation using dynamic information available from a bullet state estimator (BSE) and a target state estimation (TSE); and (6) being applicable to many weapon types with engine on/off flight conditions.

Figure 9:
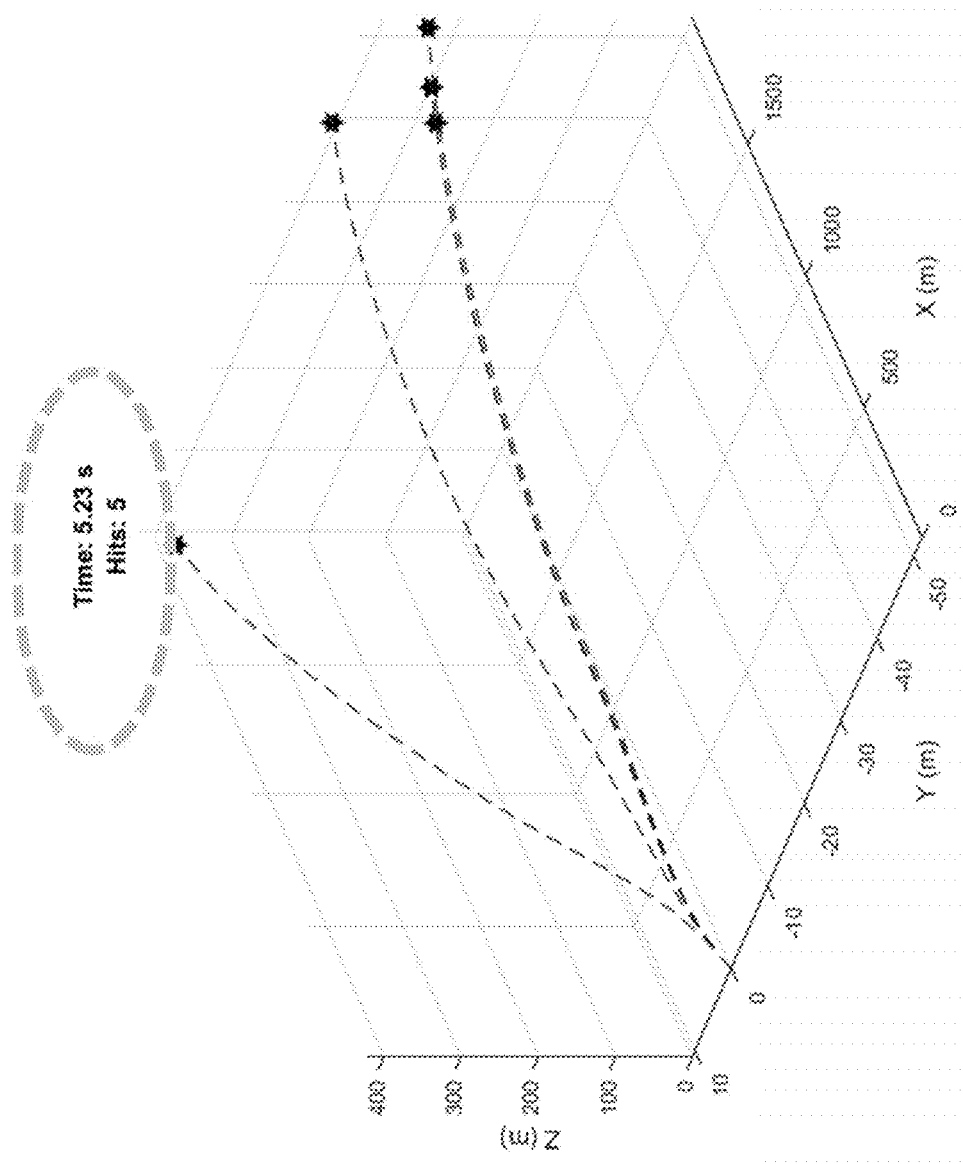
FIG. 9 illustrates an air defense mission demonstration against five UAVs according to one embodiment of the NTS GL of the present disclosure.

FIG. 8 and FIG. 9 show embodiments of the NTS GL of the present disclosure for a short range surface-to-surface and an air defense mission, respectively. In certain embodiments, the system addresses multiple targets' location uncertainty and motion variation. Referring to FIG. 8, there is sub-optimal gain $K_1$ and $K_2$ but the system still has trajectory shaping to go after various targets located at different locations.

Referring to FIG. 8, one embodiment of an NTS GL demonstration of short range surface-to-surface projectiles in a many-on-many engagement scenario according to the principles of the present disclosure is shown. There, 6 actual targets and one non target were used to demonstrate accuracy of the method. Referring to FIG. 9, an air defense mission demonstration against five UAVs according to one embodiment of the NTS GL of the present disclosure is shown. There, all targets were hit despite being in motion and at various locations.

In certain embodiments of the present disclosure, although employing a well-known nonlinear trajectory shaping (NTS) theory, the system design has many special implementation features that set it apart from previous designs and developments. Those include (1) high order shaping capability; (2) sensor field of view (FOV) constraint consideration; and (3) trajectory shaping and effective maneuvering commands with consideration of objects in the surroundings. Additionally, the system of the present disclosure provides for smooth transitions from mid-course to end-game, and an accounting for lift drag ratio (L/D) efficiency.

In certain embodiments of the present disclosure several different targets may be engaged with greater accuracy, including ground-based targets (fixed and mobile), air-based targets (at various altitudes and with various maneuvering capabilities), and time critical targets which may require trajectory shaping guidance laws that offer a capability to hit the target at a desired flight path angle (FPA) larger than 80 degrees.

Another embodiment of the present disclosure utilizes the system for commercial autonomous driver assistance system (ADAS) applications by reversely applying the principle of engagement to a collision avoidance capability and optimal path planning by working with an onboard autopilot to guide the automobile to achieve the ADAS functionality.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for controlling a projectile by implementing a nonlinear trajectory shaping guidance law, comprising:
   a memory for storing at least one application program;
   at least one processor capable of executing the at least one application program; and
   the at least one application program having instructions configured to determine flight path commands based on a dual layered nonlinear trajectory shaping guidance law calculation comprising, when executed:
   perform at least one adaptive gain calculation for velocity gain, $K_1(t)$, and position gain, $K_2(t)$;
   execute at least one flight path angle command tracking process comprising:
   applying one or more shaping coefficients to a Bessel function;
   receiving lift/drag information;
   receive input from at least one target state estimator; and
   determine at least one commanded acceleration according to $$a_c = \frac{K_1}{t_{go}}(V_f - V_m) + \frac{K_2}{t_{go}^2}(r_f - r_m - V_m t_{go})$$

where $a_c$ is the at least one commanded acceleration vector; $t_{go}$ is a time to go; $V_f$ is a final velocity vector at impact factoring in a flight path angle constraint; $V_m$ is a current projectile velocity vector; $r_f$ is a predicted intercept point (PIP) computed in real time; and $r_m$ is a current projectile position vector.

2. The system of claim 1, wherein determining the predicted intercept point (PIP) comprises rejecting at least one potential PIP that falls outside of a set of seeker look angle constraints.

3. The system of claim 1, wherein the at least one target state estimator receives data from an EO/IR and/or a RF seeker.

4. The system of claim 1, wherein the PIP is determined such that an impact angle $r_{theta}$ is is greater than 80° and less than about 90° with respect to $r_t$.

5. The system of claim 1, wherein at least one of the application programs includes instructions to determine if a range to go is below a minimum value, and if so, determines a suboptimal command acceleration $a_c$ where $K_1$ and $K_2$ are determined using a general explicit guidance (GENEX) algorithm.

6. A method for guiding projectiles using a nonlinear trajectory shaping (NTS) guidance law, comprising at least one processor including application programs, and memory, and wherein the processor has instructions configured and arranged to execute with application programs, the following:
   determining an adaptive gain for velocity gain, $K_1(t)$, and position gain, $K_2(t)$;
   executing at least one flight path angle command tracking process comprising:
   applying one or more shaping coefficients to a bessel function;
   lift/drag information;
   receiving input from at least one target state estimator; and
   determining at least one commanded acceleration according to $$a_c = \frac{K_1}{t_{go}}(V_f - V_m) + \frac{K_2}{t_{go}^2}(r_f - r_m - V_m t_{go})$$

where $a_c$ is commanded acceleration vector; $t_{go}$ is a time to go; $V_f$ is a final velocity vector at impact factoring in a flight path angle constraint; $V_m$ is a current projectile velocity vector; $r_f$ is a predicted intercept point (PIP) computed in real time; and $r_m$ is a current projectile position vector.

7. The method for guiding projectiles using a nonlinear trajectory shaping guidance law according to claim 6, wherein determining the predicted intercept point (PIP) comprises rejecting at least one potential PIP that falls outside of a set of seeker look angle constraints.

8. The method for guiding projectiles using a nonlinear trajectory shaping guidance law according to claim 6, wherein the at least one target state estimator receives data from an EO/IR and/or a RF seeker.

9. The method for guiding projectiles using a nonlinear trajectory shaping guidance law according to claim 6, wherein at least one application program includes instructions to determine if a range-to-go is below a minimum value, and if so, determines a suboptimal command acceleration $a_c$ where $K_1$ and $K_2$ are determined using a general explicit guidance (GENEX) algorithm.

10. The method for guiding projectiles using a nonlinear trajectory shaping guidance law according to claim 9, wherein the PIP is determined such that an impact angle $r_{theta}$ is greater than 80° and less than about 90°.

11. A non-transitory computer readable storage medium storing one or more application programs, the at least one application program comprising instructions, which when executed, cause a projectile to:
   perform at least one adaptive gain calculation for velocity gain, $K_1(t)$, and position gain, $K_2(t)$;
   execute at least one flight path angle command tracking process comprising:
   applying one or more shaping coefficients to a Bessel function;
   receiving lift/drag information;
   receive input from at least one target state estimator; and determine at least one commanded acceleration according to $$a_c = \frac{K_1}{t_{go}}(V_f - V_m) + \frac{K_2}{t_{go}^2}(r_f - r_m - V_m t_{go})$$

where $a_c$ is the at least one commanded acceleration vector; $t_{go}$ is a time to go; $V_f$ is a final velocity vector at impact factoring in a flight path angle constraint; $V_m$ is a current projectile velocity vector; $r_f$ is a predicted intercept point (PIP) computed in real time; and $r_m$ is a current projectile position vector.

12. The non-transitory storage medium of claim 11, the at least one application program further comprising instructions to include additional factors for the determination of commanded acceleration $a_c$ during transitions from a first stage of flight to a second stage of flight.

13. The non-transitory storage medium of claim 11, wherein factors are applied to the adaptive gain calculation instructions are based on data gathered during guidance of onboard autopilot assistance.

14. The non-transitory storage medium of claim 11, the at least one application program further comprising instructions to determine if a range to go is below a minimum value, and if so, determines a suboptimal command acceleration $a_c$ where $K_1$ and $K_2$ are determined using a general explicit guidance (GENEX) algorithm.

15. The non-transitory storage medium of claim 14, wherein the GENEX algorithm resolves to $K_1=-2$ and $K_2=6$.

16. The non-transitory storage medium of claim 15, wherein the at least one application program further comprises instructions to receive input from at least one projectile state estimator (PSE).

* * * * *